(12) United States Patent
Nakayama et al.

(10) Patent No.: US 10,502,296 B2
(45) Date of Patent: Dec. 10, 2019

(54) BALL SCREW DEVICE AND STEERING SYSTEM

(71) Applicant: JTEKT CORPORATION, Osaka-shi, Osaka (JP)

(72) Inventors: Takuya Nakayama, Okazaki (JP); Toshihiro Asakura, Chiryu (JP); Keisuke Ogawa, Toyota (JP)

(73) Assignee: JTEKT CORPORATION, Osaka (JP)

( * ) Notice: Subject to any disclaimer, the term of this patent is extended or adjusted under 35 U.S.C. 154(b) by 323 days.

(21) Appl. No.: 15/607,895

(22) Filed: May 30, 2017

(65) Prior Publication Data
US 2017/0350481 A1   Dec. 7, 2017

(30) Foreign Application Priority Data
Jun. 3, 2016 (JP) ................................. 2016-112188

(51) Int. Cl.
*F16H 25/22* (2006.01)
*B62D 3/08* (2006.01)
*B62D 3/02* (2006.01)
*B62D 3/04* (2006.01)
*B62D 3/06* (2006.01)
(Continued)

(52) U.S. Cl.
CPC ........... *F16H 25/2214* (2013.01); *B62D 3/08* (2013.01); *B62D 3/02* (2013.01); *B62D 3/04* (2013.01); *B62D 3/06* (2013.01); *F16H 25/18* (2013.01); *F16H 25/20* (2013.01); *F16H 25/22* (2013.01); *F16H 25/2204* (2013.01)

(58) Field of Classification Search
CPC .............................. F16H 25/2233; B62D 3/08
See application file for complete search history.

(56) References Cited

U.S. PATENT DOCUMENTS 2,770,155 A * 11/1956 Porters ..................... B25B 1/24
                                                                254/98
2009/0255752 A1* 10/2009 Asakura .............. F16H 25/2233
                                                                180/444
2017/0334479 A1* 11/2017 Asakura ............... B62D 5/0424
(Continued)

FOREIGN PATENT DOCUMENTS

DE        199 23 281 A1     1/2000
JP        H05-8104 U        2/1993
JP        2009-257369 A     11/2009

OTHER PUBLICATIONS

Nov. 10, 2017 Search Report issued in European Patent Application No. 17173942.8.

*Primary Examiner* — Terence Boes
(74) *Attorney, Agent, or Firm* — Oliff PLC

(57) ABSTRACT

A cylindrical retainer configured to retain balls in a rollable manner is provided inside a ball screw nut. The retainer has retainer grooves each having a shape of an elongated hole that extends in an axial direction of a ball screw shaft so as to be inclined at a predetermined angle. A first end of the ball screw nut and a first end of the retainer, which is one of two ends of the retainer that is closer to the first end of the ball screw nut, are spaced away from each other by a distance. The terminal end of the retainer groove closest to the second end of the retainer and a ball that is closest to the second end of the ball screw nut are spaced away from each other by a distance. The distance is set equal to or larger than the distance.

6 Claims, 6 Drawing Sheets

(51) Int. Cl.
*F16H 25/18* (2006.01)
*F16H 25/20* (2006.01)

(56) References Cited

U.S. PATENT DOCUMENTS

| | | | | |
|---|---|---|---|---|
| 2017/0343087 | A1* | 11/2017 | Asakura | F16H 25/2223 |
| 2017/0343088 | A1* | 11/2017 | Asakura | B62D 3/08 |
| 2017/0350482 | A1* | 12/2017 | Asakura | B21D 9/04 |
| 2017/0350483 | A1* | 12/2017 | Asakura | B62D 3/08 |
| 2018/0195590 | A1* | 7/2018 | Asakura | F16H 25/24 |
| 2019/0061806 | A1* | 2/2019 | Yamaguchi | F16H 25/2214 |

* cited by examiner

BALL SCREW DEVICE AND STEERING SYSTEM

INCORPORATION BY REFERENCE

The disclosure of Japanese Patent Application No. 2016-112188 filed on Jun. 3, 2016 including the specification, drawings and abstract, is incorporated herein by reference in its entirety.

BACKGROUND OF THE INVENTION

1. Field of the Invention

The present invention relates to a ball screw device and a steering system.

2. Description of the Related Art

There has been known an electric power steering system (EPS) configured to assist a driver's steering operation by converting rotational torque of a motor to a force for causing linear motion of a rack shaft with a ball screw device.

In this ball screw device, the ball screw nut to be rotated by the motor is threadedly engaged with the rack shaft through intermediation of balls. Along with the rotation of the ball screw nut, the balls roll between the ball screw nut and the rack shaft while being rotated in the same direction as that of the ball screw nut. When adjacent balls strike against each other along with the rolling motion of the balls, sliding resistance is generated between the adjacent balls to cause variation in the rotational torque of the ball screw device. Therefore, a ball screw device of a steering system described in Japanese Patent Application Publication No. 2009-257369 (JP 2009-257369 A) is provided with a retainer (cage) having retainer grooves that retain balls in a rollable manner so as to restrict contact between adjacent balls. This retainer is provided with a flange at the end of the retainer in an axial direction so as to restrict axial movement of the retainer. The flange is held on the ball screw nut, thereby restricting the axial movement of the retainer.

The flange of the retainer is provided by bending or the like. At the time of bending, the retainer grooves are distorted due to the bending for forming the flange, resulting in a decrease in precision of the shapes of the retainer grooves. Therefore, the balls are caught in the retainer grooves, so that friction may vary or increase. In view of such circumstances, there has been a demand to reduce contact between the retainer and other components by restricting the axial movement of the retainer without providing a flange to the retainer.

SUMMARY OF THE INVENTION

It is one object of the present invention to provide a ball screw device and a steering system that suppress variation or increase in rotational torque.

A ball screw device according to one aspect of the present invention includes a ball screw shaft having a ball rolling groove provided on its outer peripheral surface in a helical pattern, a ball screw nut having a ball rolling groove provided on its inner peripheral surface in a helical pattern, a plurality of balls provided between the ball rolling groove of the ball screw shaft and the ball rolling groove of the ball screw nut, and a retainer arranged between the ball screw shaft and the ball screw nut and having a plurality of retainer grooves configured to retain the balls in a rollable manner. A distance between a first end of the ball screw nut and a first end of the retainer, which is one of two ends of the retainer that is closer to the first end of the ball screw nut, is set equal to or larger than a distance between a terminal end of the retainer groove that is closest to a second end of the retainer and a part of the ball that is closest to a second end of the ball screw nut.

According to this structure, the distance between the first end of the ball screw nut and the first end of the retainer is set equal to or larger than the distance between a part of the retainer groove that is closest to the second end of the retainer and a part of the ball that is closest to the second end of the ball screw nut. Thus, even when the retainer moves in an axial direction along with rotation of the ball screw nut, the ball is brought into contact with the end of the retainer groove, and therefore the axial movement of the retainer is suppressed. The retainer does not protrude from the ball screw nut, thereby reducing the occurrence of a situation where the retainer is brought into contact with other components provided outside the ball screw nut. Therefore, the variation in the rotational torque of the ball screw device is suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
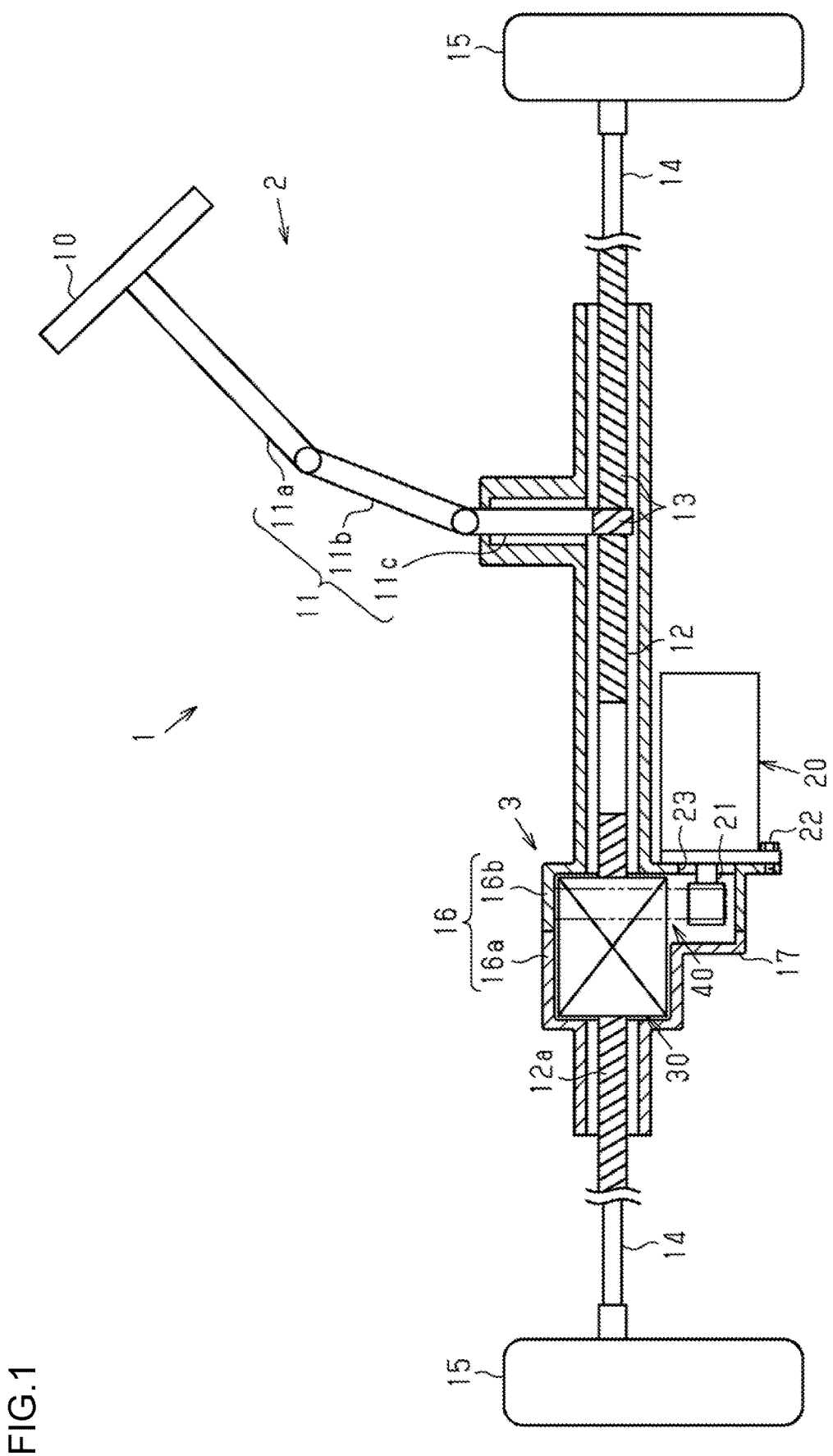
FIG. 1 is a structural view illustrating the schematic structure of a steering system of one embodiment.

An electric power steering system (EPS) that is a steering system according to one embodiment of the present invention is described below. As illustrated in FIG. 1, an EPS 1 includes a steering operation mechanism 2 configured to turn steered wheels 15 based on a driver's operation for a steering wheel 10, and an assist mechanism 3 configured to assist the driver's steering operation.

The steering operation mechanism 2 includes the steering wheel 10 and a steering shaft 11 to be rotated integrally with the steering wheel 10. The steering shaft 11 includes a column shaft 11a coupled to the steering wheel 10, an intermediate shaft 11b coupled to the lower end of the column shaft 11a, and a pinion shaft 11c coupled to the lower end of the intermediate shaft 11b. The lower end of the pinion shaft 11c is coupled to a rack shaft 12 serving as a ball screw shaft through intermediation of a rack and pinion mechanism 13. The lower end (pinion teeth) of the pinion shaft 11c meshes with the rack shaft 12 (rack teeth). Thus, rotational motion of the steering shaft 11 is converted to reciprocating linear motion of the rack shaft 12 in an axial direction thereof (lateral direction in FIG. 1) via the rack and pinion mechanism 13 formed of the pinion teeth provided at the distal end of the pinion shaft 11c and the rack teeth provided on the rack shaft 12. The reciprocating linear motion is transmitted to each of the right and left steered wheels 15 via tie rods 14 coupled to both ends of the rack shaft 12. In this manner, the steered angles of the steered wheels 15 are changed.

The assist mechanism 3 is provided on the periphery of the rack shaft 12. The assist mechanism 3 includes a motor 20 serving as an assist force generation source, a ball screw device 30 integrally attached to the periphery of the rack shaft 12, and a speed reducer 40 configured to transmit a rotational force of a rotary shaft 21 of the motor 20 to the ball screw device 30. The assist mechanism 3 assists the driver's steering operation by converting the rotational force of the rotary shaft 21 of the motor 20 to a force in the axial direction of the rack shaft 12 via the speed reducer 40 and the ball screw device 30.

The ball screw device 30, the speed reducer 40, the pinion shaft 11c, and the rack shaft 12 are covered with a rack housing 16. The rack housing 16 includes a first rack housing 16a and a second rack housing 16b that are divided in the axial direction of the rack shaft 12 in the vicinity of the assist mechanism 3. The rack housing 16 is constructed by coupling the first rack housing 16a and the second rack housing 16b to each other. The rack housing 16 includes a speed reducer housing 17 provided so as to protrude in a direction (downward direction in FIG. 1) intersecting a direction in which the rack shaft 12 extends. A part of the speed reducer 40 is accommodated in the speed reducer housing 17. A through hole 23 is provided in the wall surface of the speed reducer housing 17. The rotary shaft 21 of the motor 20 extends in the speed reducer housing 17 through the through hole 23 provided in the speed reducer housing 17. The motor 20 is fixed to the speed reducer housing 17 with a bolt 22 so that the rotary shaft 21 is parallel to the rack shaft 12.

Figure 2:
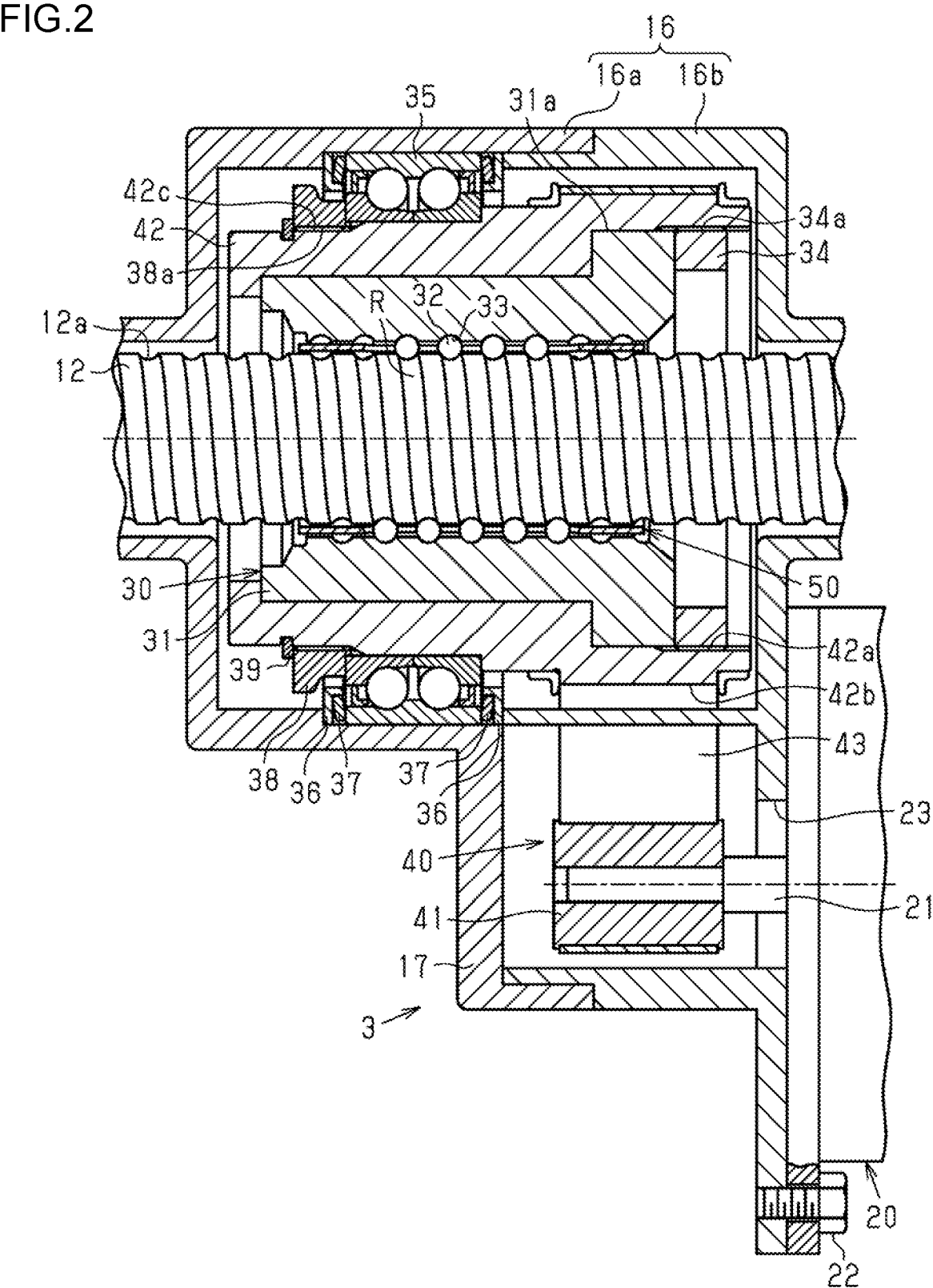
FIG. 2 is a sectional view illustrating the schematic structure of an assist mechanism in the steering system of the one embodiment.

Next, the assist mechanism 3 is described in detail. As illustrated in FIG. 2, the ball screw device 30 includes a cylindrical ball screw nut 31 threadedly engaged with the rack shaft 12 through intermediation of a plurality of balls 32. Further, the speed reducer 40 includes a driving pulley 41 integrally attached to the rotary shaft 21 of the motor 20, a driven pulley 42 integrally attached to the outer periphery of the ball screw nut 31, and a belt 43 looped over the driving pulley 41 and the driven pulley 42. On the outer peripheral surface of a first end of the ball screw nut 31 (right end of the ball screw nut 31 in FIG. 2), a flange portion 31a is provided over the entire region in a circumferential direction. The flange portion 31a is held between a cylindrical lock screw 34 and a stepped portion of the driven pulley 42, whereby the ball screw nut 31 is attached to the driven pulley 42 so as to be rotatable integrally with the driven pulley 42. A thread groove 34a provided on the outer peripheral surface of the lock screw 34 and a thread groove 42a provided on the driven pulley 42 are engaged with each other, and therefore the lock screw 34 moves in the axial direction. Thus, the lock screw 34 is driven toward the stepped portion of the driven pulley 42, and the flange portion 31a is held between the lock screw 34 and the driven pulley 42. Further, a bearing 35 is provided on the outer peripheral surface of the driven pulley 42. The bearing 35 is configured to support the driven pulley 42 and the ball screw nut 31 so that the driven pulley 42 and the ball screw nut 31 are rotatable relative to the inner peripheral surface of the rack housing 16. Further, as the belt 43, for example, there is employed a toothed belt (helical toothed belt) made of rubber with core wires embedded therein.

A helical ball track 12a is provided on the outer peripheral surface of the rack shaft 12. A helical ball track 33 corresponding to the ball track 12a of the rack shaft 12 is provided on the inner peripheral surface of the ball screw nut 31. A helical space surrounded by the ball track 33 of the ball screw nut 31 and the ball track 12a of the rack shaft 12 functions as a ball rolling path R where the balls 32 roll. Further, although the illustration is omitted, the ball screw nut 31 has a ball recirculation path that is open at two positions in the ball rolling path R and bridges the two openings. Thus, the balls 32 can endlessly circulate along the ball rolling path R via the ball recirculation path formed in the ball screw nut 31. As the ball recirculation path, for example, there is employed a deflector system in which the balls circulate in each row.

Note that the bearing 35 is supported so as to be movable in the axial direction relative to the rack housing 16. Annular plates 36 each having an L-shape in cross section are provided on both sides of an outer ring of the bearing 35 in the axial direction, and coned disc springs 37 are each provided between the plate 36 and the outer ring of the bearing 35. Inner rings of the bearing 35 are held between a stepped portion of a flange portion 42b of the driven pulley 42 in the axial direction and an annular fixing member 38. A thread groove 42c is provided on the outer peripheral surface of a part of the driven pulley 42 where the flange portion 42b is not provided (to be exact, a predetermined range from a first end of the driven pulley 42 to a second end thereof). A thread groove 38a engaged with the thread groove 42c provided on the outer peripheral surface of the driven pulley 42 is provided on the inner peripheral surface of the fixing member 38.

The fixing member 38 is attached to the driven pulley 42 by engaging the thread groove 42c provided on the outer peripheral surface of the driven pulley 42 with the thread groove 38a provided on the inner peripheral surface of the fixing member 38. When the bearing 35 is held by the stepped portion and the fixing member 38, a retaining ring 39 is fitted to the driven pulley 42. Thus, axial movement of the fixing member 38 relative to the driven pulley 42 is restricted. With this structure, the bearing 35 is supported so as to be rockable in the axial direction relative to the rack housing 16.

In the assist mechanism 3 having the structure as described above, when the rotary shaft 21 of the motor 20 is rotated, the driving pulley 41 is rotated integrally with the rotary shaft 21. The rotation of the driving pulley 41 is transmitted to the driven pulley 42 via the belt 43, and therefore the driven pulley 42 is rotated. Accordingly, the ball screw nut 31 integrally attached to the driven pulley 42 rotates together with the driven pulley 42. The ball screw nut 31 is rotated relative to the rack shaft 12, and therefore the plurality of balls 32 interposed between the ball screw nut 31 and the rack shaft 12 endlessly circulate along the ball rolling path R while being subjected to loads from the ball screw nut 31 and the rack shaft 12. Through the rolling motion of the balls 32 along the ball rolling path R, rotational torque applied to the ball screw nut 31 is converted to a force applied in the axial direction of the rack shaft 12. Therefore, the rack shaft 12 moves in the axial direction relative to the ball screw nut 31. The force applied in the axial direction to the rack shaft 12 serves as an assist force to assist the driver's steering operation.

Figure 3:
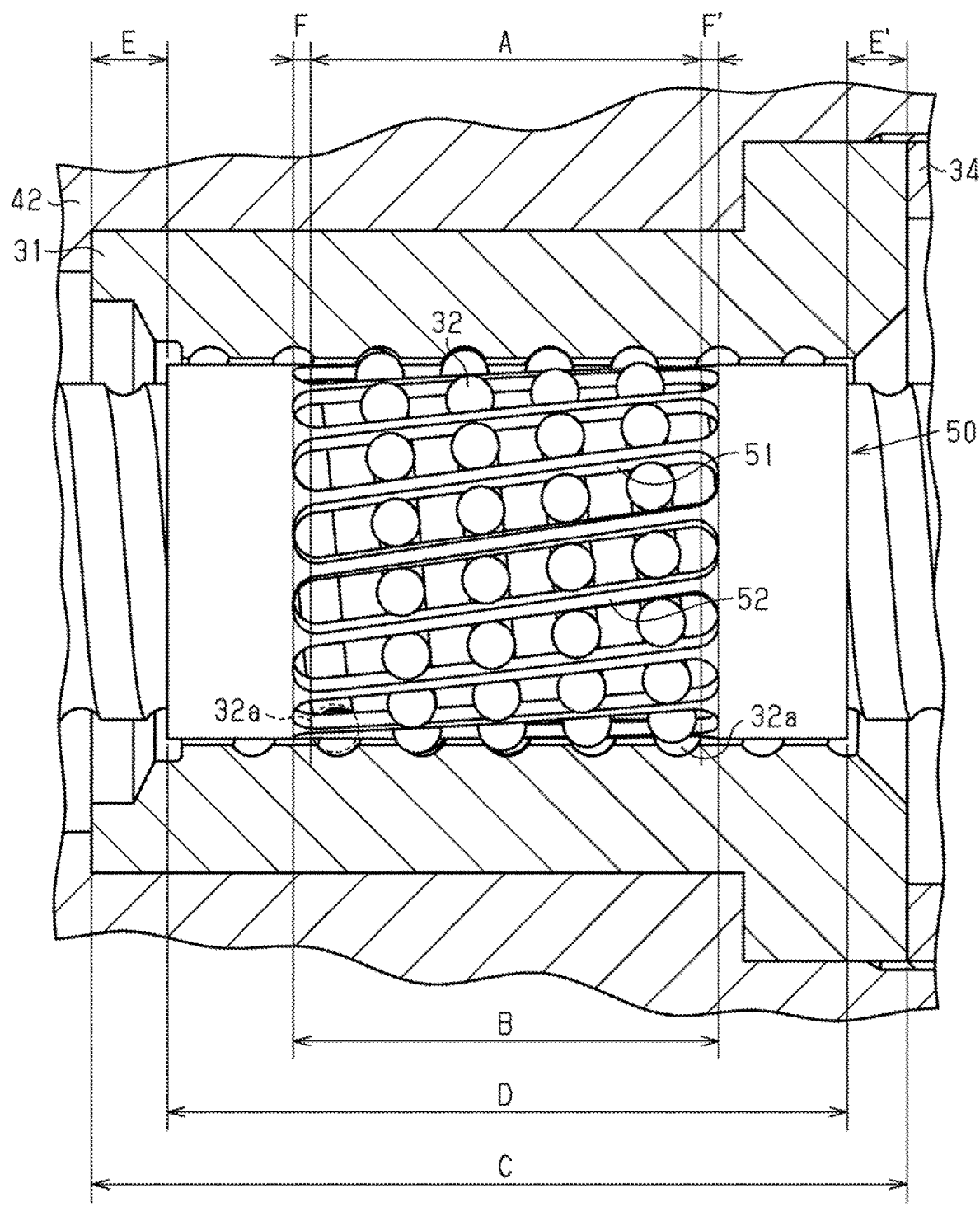
FIG. 3 is a structural view illustrating the schematic structures of a ball screw nut and a retainer in the steering system of the one embodiment.

Further, as illustrated in FIG. 3, a cylindrical retainer 50 is provided between the rack shaft 12 and the ball screw nut 31. The retainer 50 has a plurality of retainer grooves 51 configured to retain the balls 32 in a rollable manner. The retainer groove 51 has a shape of an elongated hole that extends so as to be inclined at a predetermined angle with respect to the axis of the rack shaft 12. The retainer grooves 51 are provided at regular intervals in a circumferential direction of the retainer 50. The width dimension of a separation portion 52 that separates adjacent retainer grooves 51 in the circumferential direction is sufficiently smaller than the diameter of the ball 32. The retainer groove 51 forms a right angle with respect to each of the ball track 12a of the rack shaft 12 and the ball track 33 of the ball screw nut 31. In other words, the retainer groove 51 is inclined, with respect to the axis of the rack shaft 12, at an angle equal to the lead angle of each of the ball track 12a and the ball track 33 so as to be provided at a right angle with respect to each of the ball track 12a and the ball track 33.

Figure 4:
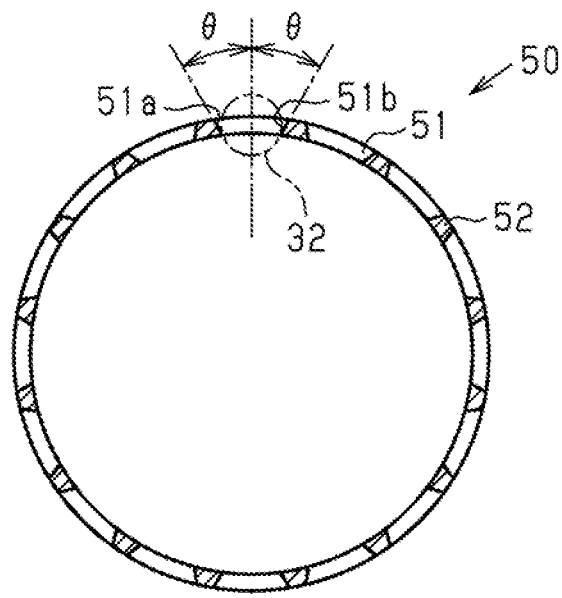
FIG. 4 is a sectional view illustrating a cross section of the retainer that is perpendicular to an axial direction thereof.

As illustrated in FIG. 4, in the circumferential direction of the retainer 50, inclined surfaces 51a and 51b are provided as inner side surfaces of the retainer groove 51, which face each other. When viewed in the axial direction of the rack shaft 12, the inclined surfaces 51a and 51b are each inclined at a predetermined angle θ with respect to a straight line that extends in a direction orthogonal to the axis of the retainer 50 so as to be spaced away from each other toward the radially outer side of the retainer 50. Further, the inclination angle θ of each of the inclined surfaces 51a and 51b is set so that the width of the retainer groove 51 in the circumferential direction is smaller than the diameter of the ball 32 on the inner periphery of the retainer 50 and larger than the diameter of the ball 32 on the outer periphery of the retainer 50. Therefore, movement of the ball 32 toward the radially outer side of the retainer groove 51 is allowed, whereas movement of the ball 32 toward the radially inner side of the retainer groove 51 is restricted. Radial movement of the retainer 50 is restricted through abutment of the inclined surfaces 51a and 51b of the retainer groove 51 against the balls 32. The support of the retainer 50 by the balls 32 reduces contact between the retainer 50 and each of the outer peripheral surface of the rack shaft 12 and the inner peripheral surface of the ball screw nut 31 (see FIG. 2 and FIG. 3).

When a force in the axial direction of the rack shaft 12 is applied to the retainer 50, the retainer 50 easily moves in the axial direction because the retainer groove 51 has the shape of an elongated hole. For example, when the ball screw nut 31 is rotated and therefore the balls 32 roll between the ball track 12a and the ball track 33 while being rotated in the same direction as that of the ball screw nut 31, a force for causing axial movement is applied to the retainer groove 51 due to the structure in which the retainer groove 51 is provided so as to be inclined at the angle corresponding to the lead angle of each of the ball track 12a and the ball track 33. Thus, when the retainer 50 protrudes in the axial direction from the ball screw nut 31, the retainer 50 may be brought into contact with the rack housing 16, the driven pulley 42, or the like. This hinders rotation of the retainer 50 in the same direction as that of the ball screw nut 31 (increases rotational resistance). Thus, the contact between the retainer groove 51 of the retainer 50 and each of the balls 32 becomes significant.

In view of the above, in this embodiment, the dimensions and arrangement of the ball screw nut 31, the balls 32, and the retainer 50 are optimized so as to restrict the axial movement of the retainer 50 by the balls 32.

As illustrated in FIG. 3, a distance A that is the sum of the distance between two balls 32a located at both ends of the ball rolling path R among the balls 32 and the diameters of the two balls 32a is set smaller than a length B of the retainer groove 51 in the axial direction. That is, the balls 32 and the retainer groove 51 have a relationship represented by the following expression.

$$A < B \tag{1}$$

Note that the distance A may be equal to the length B. In this case, however, the contact between each of the balls 32a and the retainer groove 51 is always more significant than the contact (contact pressure) between each of the balls 32 other than the balls 32a and the retainer groove 51. This is because the balls 32a are also brought into contact with the ends of the retainer groove 51 in the axial direction and therefore the contact area between each of the balls 32a and the retainer groove 51 is larger than that in a case of the balls 32 other than the balls 32a.

A length C of the ball screw nut 31 in the axial direction is set larger than a length D of the retainer 50 in the axial direction. That is, the length C and the length D have a relationship represented by the following expression.

$$C > D \tag{2}$$

A first end of the retainer 50 and a first end of the ball screw nut 31 are spaced away from each other by a distance E. Further, a second end of the retainer 50 and the second end of the ball screw nut 31 are spaced away from each other by a distance E'. Note that the difference between the length C and the length D is equal to the sum of the distance E and the distance E'.

A first ball 32a and a first end of the retainer groove 51 (left end in FIG. 3) are spaced away from each other by a distance F. Specifically, a part of the retainer groove 51 that is proximate to the first end of the retainer 50 and a part of the ball 32 that is proximate to the first end of the ball screw nut 31 are spaced away from each other by the distance F. Further, a second ball 32a and a second end of the retainer groove 51 (right end in FIG. 3) are spaced away from each other by a distance F'. Note that the difference between the length B and the distance A is equal to the sum of the distance F and the distance F'.

In this case, the distances E and E' and the distances F and F' of the retainer 50 and the ball screw nut 31 have relationships represented by the following expressions.

$$E \geq F' \tag{3}$$

$$E' \geq F \tag{4}$$

Further, when the distance E and the distance E' are equal to each other and the distance F and the distance F' are equal to each other, a relationship represented by the following expression is established.

$$(B-A)/2 \leq (C-D)/2 \tag{5}$$

Figure 5A:
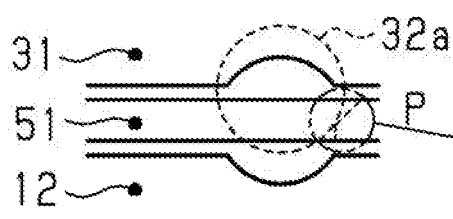
FIG. 5A is a schematic view illustrating a state in which one of balls located at both ends of a ball rolling path moves from a ball recirculation path to the ball rolling path.
Figure 5B:
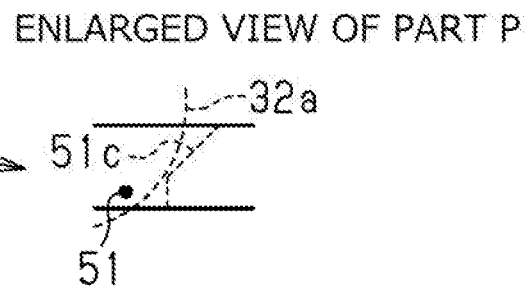
FIG. 5B is an enlarged view illustrating a part P of FIG. 5A in an enlarged manner.

Further, the end of the retainer groove 51 in the axial direction is formed into the following shape. FIG. 5A and FIG. 5B illustrate a state in which the second ball 32a out of the two balls 32a located at both ends of the ball rolling path R is moving into the ball rolling path R out of the ball recirculation path formed in the ball screw nut 31. At this time, the retainer 50 is shifted in a leftward direction in FIG. 5A. In this embodiment, in order to reduce contact between adjacent balls 32 by the retainer 50 in the ball recirculation path as well, a part of the ball 32 is received in the retainer groove 51 even when the ball 32 is located in the ball recirculation path as illustrated in FIG. 5A. The ball 32a that is moving into the ball rolling path R out of the ball recirculation path pushes the axial end of the retainer groove 51 that is located in the vicinity of the ball 32a, thereby causing the retainer 50 to move in a rightward direction in FIG. 5A.

In order to reduce resistance to be generated when the ball 32a pushes the axial end of the retainer groove 51, a chamfered portion 51c is provided at the corner of the end of the retainer groove 51 on the outer peripheral side of the retainer 50. The chamfered portion 51c may be any one of various chamfers including a 45° chamfer and curved surface chamfer such as a round chamfer.

With this structure, the resistance to be generated when the ball 32a moves into the ball rolling path R is reduced, and therefore variation in the rotational resistance of the ball screw nut 31 can be reduced. Further, the resistance to be generated when the ball 32a moves into the ball recirculation path out of the ball rolling path R is reduced, and therefore the variation in the rotational resistance of the ball screw nut 31 can be reduced.

Actions and effects of this embodiment are described. In this embodiment, the retainer 50 and the ball screw nut 31 are provided so as to satisfy the relationships represented by Expressions (1) to (4).

Also in this embodiment, the balls 32 that support the retainer 50 roll through the rotation of the ball screw nut 31, and therefore the retainer 50 moves in the axial direction of the rack shaft 12 along with the rolling motion of the balls 32. This is because the distance A that is the sum of the distance between the two balls 32a and the diameters of the two balls 32a is set smaller than the length B of the retainer groove 51 in the axial direction as represented by Expression (1). When the retainer 50 moves in the axial direction (for example, a leftward direction in FIG. 3), however, the clearance of the distance F' in FIG. 3 disappears, and the ball 32a is brought into contact with the end of the retainer groove 51. When the axial end of the retainer groove 51 is brought into contact with the ball 32a, further movement of the retainer 50 in the axial direction (for example, the leftward direction in FIG. 3) is restricted. In this case, the axial end of the retainer groove 51 is not always in contact with the ball 32a, but is brought into contact with the ball 32a only when the retainer 50 moves.

Further, in this embodiment, even when the retainer 50 moves in the axial direction, the retainer 50 does not protrude from the end of the ball screw nut 31 in the axial direction, and is not therefore brought into contact with the rack housing 16, the driven pulley 42, or the like. This is because the distance E (E') between the end of the retainer 50 and the end of the ball screw nut 31 is set equal to or larger than the distance F' (F) between the ball 32a and the end of the retainer groove 51 as represented by Expression (3) and Expression (4). Even when the retainer 50 moves, the retainer 50 does not protrude from the ball screw nut 31.

Thus, even without a flange portion at the axial end of the retainer 50, the axial movement of the retainer 50 can be suppressed. Further, the precision of the shape of the retainer groove 51 is maintained because the flange portion need not be provided at the axial end of the retainer 50.

Note that this embodiment may be modified as described below. Other embodiments described below may be combined with each other without technical contradiction.

Figure 6:
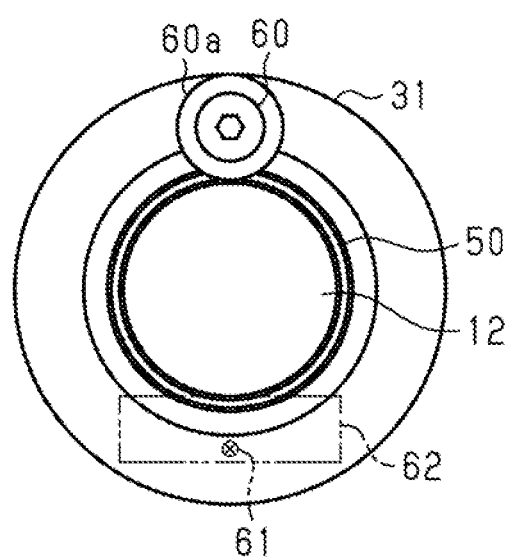
FIG. 6 is an end view illustrating the end faces of a ball screw nut, a retainer, and a rack shaft in the axial direction in a steering system of another embodiment.
Figure 7:
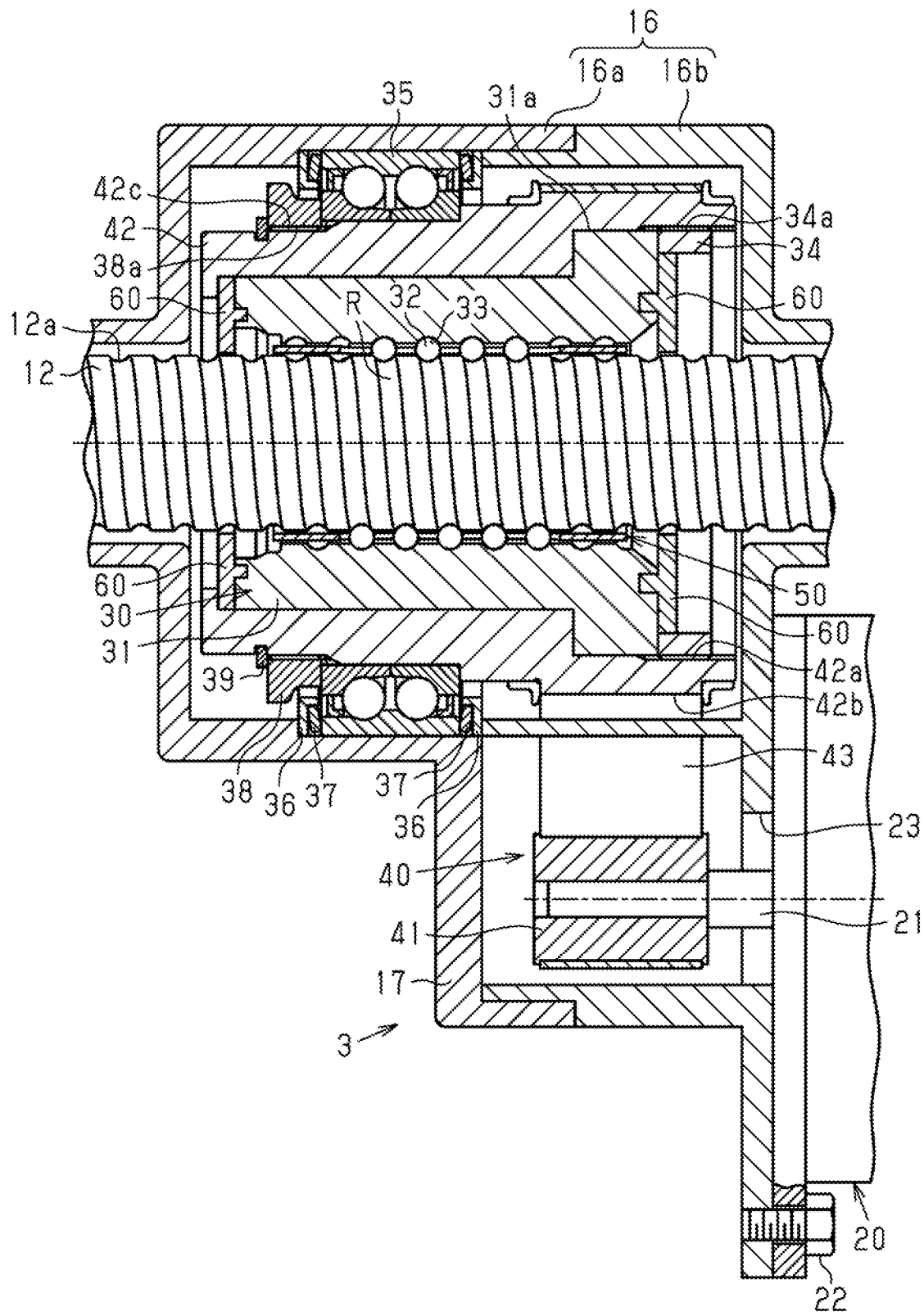
FIG. 7 is a sectional view illustrating the schematic structure of an assist mechanism in the steering system of the other embodiment.

In this embodiment, the dimensions and arrangement of the retainer 50 and the ball screw nut 31 are optimized to restrict the axial movement of the retainer 50 by the balls 32, but the embodiment is not limited thereto. For example, as illustrated in FIG. 6, screws 60 each having a flange portion 60a may be provided at both ends of the ball screw nut 31 in the axial direction, or holding plates 62 may be fixed to both ends of the ball screw nut 31 in the axial direction with countersunk head screws 61. FIG. 7 illustrates a case where the screws 60 are attached to both ends of the ball screw nut 31 in the axial direction. As illustrated in FIG. 7, the flange portions 60a of the screws 60 are located on extension lines of the retainer 50 in the axial direction. Therefore, even when the retainer 50 moves in the axial direction, one end of the retainer 50 is brought into contact with the flange portion 60a of the screw 60, and therefore the axial movement of the retainer 50 is restricted. Further, when the holding plates 62 are provided at both ends of the ball screw nut 31 in the axial direction, the holding plates 62 are located on the extension lines of the retainer 50 in the axial direction. Therefore, the axial movement of the retainer 50 is restricted.

Note that, when a distance obtained by subtracting the distance F from the distance E' is significantly small (nearly zero) in FIG. 3, it is highly likely that the retainer 50 protrudes from the ball screw nut 31 when the retainer 50 moves in the rightward direction. In this case, the screw 60 only needs to be provided at least at one end of the ball screw nut 31 in the axial direction.

This embodiment is applied to the EPS 1 configured to apply an assist force to the rack shaft 12 by the motor 20 having the rotary shaft 21 arranged parallel to the rack shaft 12, but the present invention is not limited thereto. The embodiment only needs to be applied to any steering system including the ball screw device 30 configured to convert the rotational motion of the motor 20 to the linear motion of the rack shaft 12 in the axial direction. Further, the electric power steering system configured to assist the linear motion of the rack shaft 12 associated with the steering operation by using the rotational force of the motor 20 is taken as an example, but the embodiment may be applied to a steer-by-wire (SBW) system. Note that, when the embodiment is applied to the SBW system, the embodiment may be applied not only to a front-wheel steering system but also to a rear-wheel steering system or a four-wheel steering system (4WS). That is, it is only necessary to use the ball screw device 30 configured to convert rotational motion applied to the ball screw device 30 to linear motion.

The invention claimed is:

1. A ball screw device comprising:
   a ball screw shaft having a ball rolling groove disposed on an outer peripheral surface of the ball screw shaft in a helical pattern;
   a ball screw nut having a ball rolling groove disposed on an inner peripheral surface of the ball screw nut in a helical pattern;
   a plurality of balls provided between the ball rolling groove of the ball screw shaft and the ball rolling groove of the ball screw nut; and
   a retainer arranged between the ball screw shaft and the ball screw nut, the retainer having a plurality of retainer grooves configured to retain the plurality of balls in a rollable manner, each retainer groove of the plurality of retainer grooves having (i) a straight portion extending in an axial direction of the ball screw shaft and (ii) a chamfer portion of a wall of each retainer groove in the axial direction, which intersects with the straight portion, wherein:

a distance between a first end of the ball screw nut and a first end of the retainer, which is one of two ends of the retainer that is closer to the first end of the ball screw nut, is set equal to or larger than a distance between a terminal end of the retainer groove that is closest to a second end of the retainer and a part of a last ball of the plurality of balls that is closest to a second end of the ball screw nut.

2. The ball screw device according to claim 1, further comprising a flanged screw attached to at least one end face of the ball screw nut, the flanged screw overlapping a part of an end face of the retainer when viewed in the axial direction of the ball screw shaft.

3. The ball screw device according to claim 1, further comprising a holding plate attached to at least one end face of the ball screw nut, the holding plate overlapping at least a part of the end face of the retainer when viewed in the axial direction of the ball screw shaft.

4. The ball screw device according to claim 1, wherein a distance between a part closest to the first end of the ball screw nut on one of the plurality of balls that is located at a position closest to the first end of the ball screw nut and a part closest to the second end of the ball screw nut on the last one of the plurality of balls that is located at a position closest to the second end of the ball screw nut is set smaller than a distance between a first part of the retainer groove that is closest to the first end of the ball screw nut and a second part of the retainer groove that is closest to the second end of the ball screw nut.

5. The ball screw device according to claim 1, wherein the chamfered portion is provided at a corner of the end of the retainer groove in the axial direction on an outer peripheral side of the retainer.

6. A steering system comprising the ball screw device according to claim 1.

* * * * *